US012703767B2

(12) United States Patent
Tetsui et al.

(10) Patent No.: US 12,703,767 B2
(45) Date of Patent: Aug. 11, 2026

(54) FIBER BASE MATERIAL AND ARTIFICIAL LEATHER

(71) Applicant: DIC Corporation, Tokyo (JP)

(72) Inventors: Tomohiro Tetsui, Takaishi (JP); Miwa Ueguchi, Takaishi (JP)

(73) Assignee: DIC Corporation, Tokyo (JP)

( * ) Notice: Subject to any disclaimer, the term of this patent is extended or adjusted under 35 U.S.C. 154(b) by 830 days.

(21) Appl. No.: 17/766,609

(22) PCT Filed: Sep. 17, 2020

(86) PCT No.: PCT/JP2020/035178
§ 371 (c)(1),
(2) Date: Apr. 5, 2022

(87) PCT Pub. No.: WO2021/084954
PCT Pub. Date: May 6, 2021

(65) Prior Publication Data

US 2024/0109999 A1 Apr. 4, 2024

(30) Foreign Application Priority Data

Oct. 28, 2019 (JP) ................................ 2019-195227

(51) Int. Cl.

| | |
|---|---|
| ***C08G 18/32*** | (2006.01) |
| ***C08G 18/08*** | (2006.01) |
| ***C08G 18/10*** | (2006.01) |
| ***C08G 18/12*** | (2006.01) |
| ***C08G 18/24*** | (2006.01) |
| ***C08G 18/28*** | (2006.01) |
| ***C08G 18/34*** | (2006.01) |
| ***C08G 18/48*** | (2006.01) |
| ***C08G 18/75*** | (2006.01) |
| ***C08J 5/24*** | (2006.01) |
| ***C08L 75/04*** | (2006.01) |
| ***C08L 75/08*** | (2006.01) |
| ***D06M 15/568*** | (2006.01) |
| ***D06M 23/04*** | (2006.01) |
| ***D06N 3/14*** | (2006.01) |
| *D06M 101/32* | (2006.01) |

(52) U.S. Cl.
CPC ..... *C08G 18/3228* (2013.01); *C08G 18/0866* (2013.01); *C08G 18/10* (2013.01); *C08G 18/12* (2013.01); *C08G 18/244* (2013.01); *C08G 18/283* (2013.01); *C08G 18/3234* (2013.01); *C08G 18/348* (2013.01); *C08G 18/4808* (2013.01); *C08G 18/4833* (2013.01); *C08G 18/4858* (2013.01); *C08G 18/758* (2013.01); *C08J 5/246* (2021.05); *D06M 15/568* (2013.01); *D06M 23/04* (2013.01); *C08G 2110/0066* (2021.01); *C08J 2375/04* (2013.01); *C08J 2375/08* (2013.01); *C08J 2467/00* (2013.01); *C08L 75/04* (2013.01); *C08L 75/08* (2013.01); *D06M 2101/32* (2013.01); *D06N 3/14* (2013.01)

(58) Field of Classification Search
CPC ... C08G 18/0866; C08J 5/246; C08J 2375/04; C08J 2375/08; D06M 15/568; D06N 3/14; C08L 75/04; C08L 75/08
See application file for complete search history.

(56) References Cited

U.S. PATENT DOCUMENTS

| | | | |
|---|---|---|---|
| 6,794,446 | B1 | 9/2004 | Takeda et al. |
| 2006/0058453 | A1 | 3/2006 | Argyropoulos et al. |
| 2006/0183850 | A1 | 8/2006 | Liu et al. |
| 2006/0183851 | A1 | 8/2006 | Liu et al. |
| 2007/0259984 | A1 | 11/2007 | Dorr et al. |
| 2015/0284902 | A1 | 10/2015 | Bhattacharjee et al. |
| 2021/0164157 | A1 | 6/2021 | Tetsui |

FOREIGN PATENT DOCUMENTS

| | | | |
|---|---|---|---|
| CN | 1708524 | A | 12/2005 |
| JP | H05-306317 | A | 11/1993 |
| JP | 2007-119749 | A | 5/2007 |
| JP | 2008-530308 | A | 8/2008 |
| JP | 2013-119688 | A | 6/2013 |
| JP | 2013-217006 | A | 10/2013 |
| JP | 6521349 | B1 | 5/2019 |
| KR | 1998-066933 | A | 10/1998 |
| TW | 201915258 | A | 4/2019 |

OTHER PUBLICATIONS

Office Action dated Apr. 27, 2023, issued for Chinese Patent Application No. 202080060679.7 and English translation thereof.

*Primary Examiner* — Kregg T Brooks
*Assistant Examiner* — David R. Foss
(74) *Attorney, Agent, or Firm* — Troutman Pepper Locke LLP; James E. Armstrong, IV

(57) ABSTRACT

A task to be achieved by the invention is to provide a fiber substrate having excellent filling state of a urethane resin and excellent hand feeling. The present invention provides a fiber substrate filled with a urethane resin (X), which is formed from a water dispersion of the urethane resin (X), wherein the water dispersion has a urethane resin (X) content of 50 to 80% by mass, and the water dispersion contains no organic solvent. Further, the present invention provides an artificial leather having the above-mentioned fiber substrate. It is preferred that the urethane resin (X) uses a chain extender (a1) as a raw material. Further, the chain extender (a1) which has an amino group is preferably used.

10 Claims, No Drawings

FIBER BASE MATERIAL AND ARTIFICIAL LEATHER

TECHNICAL FIELD

The present invention relates to a fiber substrate filled with a urethane resin and an artificial leather.

BACKGROUND ART

Urethane resins have excellent mechanical strength and hand feeling, and are therefore widely used in the production of synthetic leather, artificial leather, a coating agent, an adhesive, gloves, clothing, and the like. For example, in the field of artificial leather, generally, a nonwoven fabric substrate is impregnated with a solvent urethane resin composition and subjected to wet coagulation, forming a uniform and flexible substrate having voids in the nonwoven fabric fibers filled with a urethane porous material.

In the solvent urethane resin composition, N,N-dimethylformamide (DMF) is used as a solvent, but there is concern that the DMF adversely affects living bodies and the environment, and the use of DMF is more and more strictly regulated, and therefore the development of an environment-friendly urethane resin using a weak solvent or an aqueous solvent, or using no solvent, or the like is required.

Especially, in recent years, a polyurethane dispersion (PUD) having a urethane resin dispersed in water is being used in the artificial leather application. However, the PUD has a disadvantage in that the filling state of the PUD inside the fiber substrate is not porous, which is different from that of a conventional solvent urethane resin composition, and further the urethane resin is segregated to the surface of the fiber substrate in the drying step for water, so that the resultant fiber substrate has hard hand feeling.

In this situation, as a method for solving the problem, a method of incorporating microcapsules into the urethane resin water dispersion, a mechanical foaming method of dispersing a gas in the urethane resin water dispersion, and the like have been proposed (see, for example, PTL 1). However, it has been pointed out that the former method has problems in that the improvement of the hand feeling is small and in that expansion of the microcapsules causes poor smoothness, and further the latter method is disadvantageous in that the bubbles in the dispersion are gathered and disappear during drying of the urethane resin water dispersion, making it extremely difficult to control the size and amount of bubbles.

CITATION LIST

Patent Literature

PTL 1: JP-A-2013-119688

SUMMARY OF INVENTION

Technical Problem

A task to be achieved by the invention is to provide a fiber substrate having excellent filling state of a urethane resin and excellent hand feeling.

Solution to Problem

The invention provides a fiber substrate filled with a urethane resin (X), which is formed from a water dispersion of the urethane resin (X), wherein the water dispersion has a urethane resin (X) content of 50 to 80% by mass, and the water dispersion contains no organic solvent.

Further, the invention provides an artificial leather having the above-mentioned fiber substrate.

Advantageous Effects of Invention

The fiber substrate of the invention has excellent filling state of a urethane resin and excellent hand feeling. Therefore, the fiber substrate of the invention can be especially advantageously used as an artificial leather.

DESCRIPTION OF EMBODIMENTS

The fiber substrate of the invention is filled with a urethane resin (X), which is formed from a water dispersion of the urethane resin (X).

The water dispersion of the urethane resin (X) has a urethane resin (X) content of 50 to 80% by mass, and contains no organic solvent.

In the invention, it is necessary that the urethane resin (X) content be in the range of from 50 to 80% by mass. The so-called urethane resin (X) solids content of the water dispersion is high as mentioned above, and therefore, when foaming the water dispersion by mechanical foaming or introducing gas, the water dispersion is excellent in retention of foam, and further the urethane resin water dispersion has improved drying properties, and thus the filling state of the urethane resin (X) for the inside of the fiber substrate is excellent, and a crack or the like is not caused in the cured product of urethane resin (X) being dried and/or after dried, so that excellent hand feeling, adhesion to the fiber substrate, and mechanical strength can be achieved. From the viewpoint of achieving further excellent filling state, hand feeling, and mechanical strength, the urethane resin (X) content is preferably in the range of from 53 to 70% by mass, more preferably in the range of from 55 to 70% by mass, further preferably in the range of from 57 to 65% by mass.

The urethane resin (X) can be dispersed in water, and, for example, a urethane resin having a hydrophilic group, such as an anionic group, a cationic group, or a nonionic group; a urethane resin which is forcibly dispersed in water using an emulsifying agent, or the like can be used. These urethane resins may be used individually or in combination. Among these, in view of the production stability and water dispersion stability, a urethane resin having a hydrophilic group is preferably used, and a urethane resin having an anionic group and/or a nonionic group is more preferred.

As a method for obtaining the urethane resin having an anionic group, for example, there can be mentioned a method using as a raw material at least one compound selected from the group consisting of a glycol compound having a carboxyl group and a compound having a sulfonyl group.

As the glycol compound having a carboxyl group, for example, 2,2-dimethylolpropionic acid, 2,2-dimethylolbutanoic acid, 2,2-dimethylolbutyric acid, 2,2-dimethylolpropionic acid, 2,2-valeric acid, or the like can be used. These compounds may be used individually or in combination.

As the compound having a sulfonyl group, for example, there can be used 3,4-diaminobutanesulfonic acid, 3,6-diamino-2-toluenesulfonic acid, 2,6-diaminobenzenesulfonic acid, N-(2-aminoethyl)-2-aminosulfonic acid, N-(2-aminoethyl)-2-aminoethylsulfonic acid, N-2-aminoethane-2-aminosulfonic acid, N-(2-aminoethyl)-β-alanine; or a salt thereof. These compounds may be used individually or in combination.

As a method for obtaining the urethane resin having a nonionic group, for example, there can be mentioned a method using a compound having an oxyethylene structure as a raw material.

As the compound having an oxyethylene structure, for example, polyether polyol having an oxyethylene structure, such as polyethylene glycol, polyoxyethylene polyoxypropylene glycol, polyoxyethylene polyoxytetramethylene glycol, or polyethylene glycol dimethyl ether, can be used. These compounds may be used individually or in combination. Of these, from the viewpoint of more easily controlling the hydrophilicity, polyethylene glycol and/or polyethylene glycol dimethyl ether is preferably used.

From the viewpoint of achieving further excellent emulsifiability and water dispersion stability, the raw material used for obtaining the urethane resin having a nonionic group preferably has a number average molecular weight in the range of from 200 to 10,000, more preferably in the range of from 300 to 3,000, more preferably in the range of from 300 to 2,000. The number average molecular weight of the raw material used for obtaining the urethane resin having a nonionic group indicates a value measured by a gel permeation column chromatography (GPC) method.

As a method for obtaining the urethane resin having a cationic group, for example, there can be mentioned a method using one or two or more compounds having an amino group as a raw material.

As the compound having an amino group, for example, there can be used a compound having a primary or secondary amino group, such as triethylenetetramine or diethylenetriamine; a compound having a tertiary amino group, e.g., an N-alkyldialkanolamine, such as N-methyldiethanolamine or N-ethyldiethanolamine, or an N-alkyldiaminoalkylamine, such as N-methyldiaminoethylamine or N-ethyldiaminoethylamine; or the like. These compounds may be used individually or in combination.

As the emulsifying agent which can be used for obtaining the urethane resin forcibly dispersed in water, for example, there can be used a nonionic emulsifying agent, such as polyoxyethylene nonylphenyl ether, polyoxyethylene lauryl ether, polyoxyethylene styrylphenyl ether, polyoxyethylene sorbitol tetraoleate, or a polyethylene-polypropylene copolymer; an anionic emulsifying agent, such as a fatty acid salt, e.g., sodium oleate, or an alkylsulfate salt, an alkylbenzenesulfonic acid salt, an alkylsulfosuccinic acid salt, a naphthalenesulfonic acid salt, a polyoxyethylene alkylsulfuric acid salt, an alkaneslfonate sodium salt, or an alkyl diphenyl ether sulfonic acid sodium salt; a cationic emulsifying agent, such as an alkylamine salt, an alkyltrimethylammonium salt, or an alkyldimethylbenzylammonium salt, or the like. These emulsifying agents may be used individually or in combination.

With respect to the urethane resin (X), specifically, for example, a reaction product of a chain extender (a1), a polyol (a2), a polyisocyanate (a3), and, if necessary, a compound (a4) having a hydrophilic group (raw material used for obtaining the urethane resin having an anionic group, urethane resin having a cationic group, and urethane resin having a nonionic group) can be used.

As the chain extender (a1), a chain extender having a molecular weight of less than 500 (preferably in the range of from 50 to 450) can be used, specifically, there can be used a chain extender having a hydroxyl group, such as ethylene glycol, diethylene glycol, triethylene glycol, propylene glycol, dipropylene glycol, 1,3-propanediol, 1,3-butanediol, 1,4-butanediol, hexamethylene glycol, saccharose, methylene glycol, glycerol, sorbitol, bisphenol A, 4,4'-dihydroxydiphenyl, 4,4'-dihydroxydiphenyl ether, or trimethylolpropane; a chain extender having an amino group, such as ethylenediamine, 1,2-propanediamine, 1,6-hexamethylenediamine, piperazine, 2,5-dimethylpiperazine, isophoronediamine, 1,2-cyclohexanediamine, 1,3-cyclohexanediamine, 1,4-cyclohexanediamine, 4,4'-dicyclohexylmethanediamine, 3,3'-dimethyl-4,4'-dicyclohexylmethanediamine, 1,4-cyclohexanediamine, or hydrazine; or the like. These chain extenders may be used individually or in combination. The molecular weight of the chain extender (a1) indicates a value determined by calculation from the chemical formula.

With respect to the chain extender (a1), from the viewpoint of easily achieving chain extension even at a relatively low temperature of 30° C. or lower to suppress the energy consumption during the reaction, and from the viewpoint of achieving further excellent mechanical strength due to introduction of a urea group, hand feeling, and peel strength, a chain extender having an amino group (hereinafter, referred to simply as "amine chain extender") is preferably used, and, from the viewpoint of achieving further excellent retention of foam, emulsifiability, filling state, and water dispersion stability even when increasing the solids content of the urethane resin (X), an amine chain extender having a molecular weight in the range of from 30 to 250 is more preferably used. When two or more types of the chain extenders are used in combination, the molecular weight of the chain extenders means an average of the molecular weights, and the chain extenders may have molecular weights such that the average of the molecular weights falls in the above-mentioned preferred range of the molecular weight.

From the viewpoint of achieving further excellent mechanical strength, hand feeling, peel strength, retention of foam, filling state, emulsifiability, and water dispersion stability, and from the viewpoint of further easily increasing the solids content of the urethane resin (X), the amount of the chain extender (a1) used is further preferably in the range of from 0.1 to 30% by mass, especially preferably in the range of from 0.5 to 10% by mass, based on the total mass of the raw materials constituting the urethane resin (X).

As the polyol (a2), for example, polyether polyol, polyester polyol, polyacrylic polyol, polycarbonate polyol, polybutadiene polyol, or the like can be used. These polyols may be used individually or in combination. When the urethane resin having a nonionic group is used as the urethane resin (X), a polyol other than the raw material used for obtaining the urethane resin having a nonionic group is used as the polyol (a2).

From the viewpoint of the mechanical strength of the obtained film, the polyol (a2) preferably has a number average molecular weight in the range of from 500 to 100,000, more preferably in the range of from 800 to 10,000. The number average molecular weight of the polyol (a2) indicates a value measured by a gel permeation column chromatography (GPC) method.

From the viewpoint of achieving further excellent mechanical strength, the amount of the polyol (a2) used is further preferably in the range of from 40 to 90% by mass, especially preferably in the range of from 50 to 80% by mass, based on the total mass of the raw materials constituting the urethane resin (X).

As the polyisocyanate (a3), for example, there can be used an aromatic polyisocyanate, such as phenylene diisocyanate, toluene diisocyanate, diphenylmethane diisocyanate, xylylene diisocyanate, naphthalene diisocyanate, polymethylene polyphenyl polyisocyanate, or carbodiimidated diphenylmethane polyisocyanate; an aliphatic polyisocyanate or alicyclic polyisocyanate, such as hexamethylene diisocyanate, lysine diisocyanate, cyclohexane diisocyanate, isophorone diisocyanate, dicyclohexylmethane diisocyanate, xylylene diisocyanate, tetramethylxylylene diisocyanate, dimer acid diisocyanate, or norbornene diisocyanate, or the like. These polyisocyanates may be used individually or in combination.

From the viewpoint of achieving further excellent mechanical strength, the amount of the polyisocyanate (a3) used is further preferably in the range of from 5 to 40% by mass, especially preferably in the range of from 10 to 35% by mass, based on the total mass of the raw materials constituting the urethane resin (X).

From the viewpoint of achieving further excellent retention of foam, emulsifiability, water dispersion stability, filling state, and hand feeling, the amount of the compound (a4) having a hydrophilic group used is preferably 5% by mass or less, more preferably 2% by mass or less, further preferably in the range of from 0.25 to 2% by mass, especially preferably in the range of from 0.5 to 1.8% by mass, based on the total mass of the raw materials constituting the urethane resin (X).

From the viewpoint of achieving further excellent retention of foam, surface smoothness, hand feeling, and filling state, the urethane resin (X) preferably has an average particle diameter in the range of from 0.01 to 1 μm, more preferably in the range of from 0.05 to 0.9 μm. A method for measuring the average particle diameter of the urethane resin (X) is described in the Examples shown below.

As the water used in the invention, ion-exchanged water, distilled water, or the like can be used. These waters may be used individually or in combination.

The urethane resin water dispersion used in the invention contains the above-mentioned urethane resin (X) and water as essential components, but may contain an additional additive if necessary.

With respect to the additional additive, for example, there can be used an emulsifying agent, a crosslinking agent, a neutralizing agent, a thickener, a urethane-forming reaction catalyst, a filler, a pigment, a dye, a flame retardant, a leveling agent, an anti-blocking agent, a film forming auxiliary, a foaming agent, or the like. These additives may be used individually or in combination. The additive or additives are appropriately selected according to the purpose for which the foamed sheet is used. The urethane resin water dispersion used in the invention contains no organic solvent in the production process therefor, but it is acceptable for the urethane resin water dispersion to contain an organic solvent as the additive.

The method for producing the urethane resin water dispersion used in the invention is described below.

The method for producing the urethane resin water dispersion used in the invention has the steps of: reacting the above-mentioned polyol (a2), polyisocyanate (a3), and compound (a4) having a hydrophilic group with each other without using a solvent to obtain a urethane prepolymer (i) having an isocyanate group (hereinafter, referred to simply as "prepolymer step"), and then dispersing the urethane prepolymer (i) in the water (hereinafter, referred to simply as "emulsifying step"), and subsequently reacting the above-mentioned chain extender (a1) with the resultant urethane prepolymer to obtain a urethane resin (X) (hereinafter, referred to simply as "chain extension step").

It is important that the prepolymer step is conducted without using a solvent. In conventional techniques, the prepolymer step is generally conducted in an organic solvent, such as methyl ethyl ketone or acetone, but the desolvation step for distilling off the organic solvent is needed after the emulsifying step, and several days of the production duration in the actual production site are required. Further, it is difficult to completely distill off the organic solvent in the desolvation step, and it is likely that a slight amount of the organic solvent inevitably remains, making it difficult to successfully take environmental measures. On the other hand, in the method for producing the urethane resin water dispersion in the invention, the prepolymer step is conducted without using a solvent, and therefore a urethane resin water dispersion containing completely no organic solvent can be obtained, and it is possible to save the power needed for the production process therefor.

Further, when the prepolymer step is conducted by a conventional method using an organic solvent, it is likely that the urethane resin cannot be emulsified, or even if the urethane resin can be emulsified, the resultant urethane resin has a too large particle diameter, and the region in which an excellent urethane resin water dispersion can be obtained is considerably limited. The reason for this has not yet been elucidated, but a reason is considered such that an organic solvent, a neutralizing agent (for controlling the acid value of the urethane resin having an anionic group), or the like inhibits the ability of the hydrophilic group of the urethane resin which is being emulsified.

In contrast, in the invention, the prepolymer step is conducted without using a solvent, and therefore there can be stably obtained a urethane resin water dispersion having an average particle diameter equivalent to that obtained by a conventional method, wherein the urethane resin water dispersion is in the region in which it has been particularly difficult to obtain the urethane resin water dispersion by a conventional method, namely in the region in which the amount of the hydrophilic group introduced is small and a chain extender is reacted with the prepolymer.

From the viewpoint of achieving further excellent retention of foam, surface smoothness, filling state, hand feeling, peel strength, and mechanical strength, in the prepolymer step, the molar ratio of the isocyanate group of the polyisocyanate (a3) to the total of the hydroxyl group of the polyol (a2) and the hydroxyl group and amino group of the compound (a4) having a hydrophilic group [isocyanate group/(hydroxyl group and amino group)] is preferably in the range of from 1.1 to 3, more preferably in the range of from 1.2 to 2.

The reaction for the prepolymer step is conducted, for example, at 50 to 120° C. for 1 to 10 hours.

The prepolymer step can be conducted using a reaction vessel having an agitating element; a kneading machine, such as a kneader, a continuous kneader, a taper roll, a single-screw extruder, a twin-screw extruder, a triple-screw extruder, a universal mixing machine, PLASTOMILL, or a Bodeda kneading machine; a rotary dispersion mixing machine, such as TK Homomixer, FILMIX, Ebara Milder, CLEARMIX, ULTRA-TURRAX, CAVITRON, or BIO-MIXER; an ultrasonic dispersing apparatus; an apparatus which has no moving part and is capable of mixing a fluid due to flow of the fluid itself, such as an in-line mixer; or the like.

The emulsifying step is preferably conducted at a temperature at which water is not evaporated, for example, at a temperature in the range of from 10 to 90° C. The emulsifying step can be conducted using an apparatus similar to that used in the prepolymer step. Especially, from the viewpoint of easily obtaining a urethane resin water dispersion having a high urethane resin content, a kneading machine is preferably used, and a twin-screw extruder is more preferred.

The chain extension step is the step of reacting the isocyanate group of the urethane prepolymer (i) and the chain extender (a1) to increase the urethane prepolymer (i) in molecular weight, obtaining a urethane resin (X). With respect to the temperature for the chain extension step, in view of the productivity, the chain extension step is preferably conducted at 50° C. or lower.

From the viewpoint of achieving further excellent filling state, hand feeling, and mechanical strength, in the chain extension step, the molar ratio of the total of the hydroxyl group and amino group of the chain extender (a1) to the isocyanate group of the urethane prepolymer (i) [(hydroxyl group and amino group)/isocyanate group] is preferably in the range of from 0.8 to 1.1, more preferably in the range of from 0.9 to 1.

The chain extension step can be conducted using an apparatus similar to that used in the prepolymer step.

The fiber substrate of the invention is described below.

The fiber substrate can be produced by obtaining a foamed liquid from the water dispersion of the urethane resin (X), and impregnating a fiber substrate with the foamed liquid and drying the resultant substrate.

As the fiber substrate, for example, there can be used a fiber substrate, such as nonwoven fabric, woven fabric, or knitted fabric, each formed from a polyester fiber, a polyethylene fiber, a nylon fiber, an acrylic fiber, a polyurethane fiber, an acetate fiber, a rayon fiber, a polylactic acid fiber, cotton, linen, silk, wool, a glass fiber, a carbon fiber, a mixed fiber thereof, or the like.

As a method for obtaining a foamed liquid from the water dispersion of the urethane resin (X), for example, there can be mentioned manual stirring, a method using a mixer, such as a mechanical mixer, and a method of introducing air or inert gas. Such a foamed liquid obtained from the water dispersion enables production of a porous material of the urethane resin (X) entangled with the fiber in the fiber substrate. When using a mixer, for example, there can be mentioned a method in which the water dispersion is stirred at 500 to 3,000 rpm for 10 seconds to 3 minutes. In this case, from the viewpoint of easily controlling the density of the foamed urethane sheet to be in the preferred range, the foamed liquid obtained after foaming preferably has a volume 1.3 to 7 times, more preferably 1.3 to 5 times, further preferably 1.3 to 3 times the volume of the water dispersion of the urethane resin (X) before being foamed.

As a method for impregnating a fiber substrate with the obtained foamed liquid, for example, there can be mentioned a method in which the foamed liquid is applied to the fiber substrate, and then the foamed liquid is mechanically incorporated into the fiber; and a method in which the fiber substrate is immersed in the foamed liquid contained in a bath and an excess of the foamed liquid is squeezed by a mangle or the like.

As a method for applying the foamed liquid to the fiber substrate, for example, there can be mentioned a method using a roll coater, a knife coater, a comma coater, an applicator, or the like. Further, as a method for incorporating the foamed liquid into the fiber, for example, there can be mentioned a method in which the foamed liquid is incorporated into the fiber from the top side and/or the bottom side of the fiber substrate using a roll, a scraper, or the like.

As a method for drying the impregnated material, for example, there can be mentioned a method in which the impregnated material is dried at a temperature of 60 to 130° C. for 30 seconds to 10 minutes.

The artificial leather of the invention is described below.

The artificial leather of the invention has at least the fiber substrate, and, if necessary, may have a skin layer, a surface treatment layer, or the like formed on the fiber substrate. As a material for forming the skin layer and surface treatment layer, a known material can be used.

EXAMPLES

Hereinbelow, the invention will be described in more detail with reference to the following Examples.

Synthesis Example 1

1,000 Parts by mass of polyether polyol ("PTMG 2000", manufactured by Mitsubishi Chemical Corporation; number average molecular weight: 2,000; hereinafter, abbreviated to "PTMG 2000"), 24 parts by mass of 2,2-dimethylolpropionic acid (hereinafter, abbreviated to "DMPA"), and 262 parts by mass of dicyclohexylmethane diisocyanate (hereinafter, abbreviated to "HMDI") were reacted in the presence of 0.1 part by mass of tin(II) octylate at 100° C. until the NCO % reached 2.1% by mass to obtain a urethane prepolymer A 1.

A1 heated to 70° C., triethylamine, a 20% by mass aqueous solution of sodium dodecylbenzenesulfonate ("NEOGEN S-20F", manufactured by Dai-ichi Kogyo Seiyaku Co., Ltd.) as an emulsifying agent, and water were fed at the same time to a twin-screw extruder (TEM-18SS, manufactured by Toshiba Machine Co., Ltd.) and mixed with each other to obtain an emulsion. The respective feed rates of the liquids fed were as follows: A1: 10 kg/hour; triethylamine: 0.2 kg/hour; aqueous solution of emulsifying agent: 2.0 kg/hour; water: 5.1 kg/hour; and operating conditions for the twin-screw extruder were those at 50° C. and 260 rpm.

Then, immediately a water diluted liquid of isophoronediamine (hereinafter, abbreviated to "IPDA") having an amino group content corresponding to 95% of the NCO group was added to cause chain extension, so that a polyurethane emulsion (X-1) having a urethane resin content of 50% by mass was finally obtained.

Synthesis Example 2

1,000 Parts by mass of PTMG 2000, 24 parts by mass of DMPA, and 262 parts by mass of HMDI were reacted in the presence of 0.1 part by mass of tin(II) octylate at 100° C. until the NCO % reached 2.1% by mass to obtain a urethane prepolymer A2.

A2 heated to 70° C., triethylamine, a polypropylene-polyethylene copolymer ("PLURONIC L-64", manufactured by ADEKA Corporation) as an emulsifying agent, and water were fed at the same time to a twin-screw extruder (TEM-18SS, manufactured by Toshiba Machine Co., Ltd.) and mixed with each other to obtain an emulsion. The respective feed rates of the liquids fed were as follows: A2: 10 kg/hour; triethylamine: 0.2 kg/hour; L-64: 0.5 kg/hour; water: 7.1 kg/hour; and operating conditions for the twin-screw extruder were those at 50° C. and 260 rpm.

Then, immediately a water diluted liquid of IPDA having an amino group content corresponding to 95% of the NCO group was added to cause chain extension, so that a polyurethane emulsion (X-2) having a urethane resin content of 50% by mass was finally obtained.

Synthesis Example 3

1,000 Parts by mass of PTMG 2000, 24 parts by mass of DMPA, and 262 parts by mass of HMDI were reacted in the presence of 0.1 part by mass of tin(II) octylate at 100° C. until the NCO % reached 2.1% by mass to obtain a urethane prepolymer A3.

A3 heated to 70° C., triethylamine, and water were fed at the same time to a twin-screw extruder (TEM-18SS, manufactured by Toshiba Machine Co., Ltd.) and mixed with each other to obtain an emulsion. The respective feed rates of the liquids fed were as follows: A3: 10 kg/hour; triethylamine: 0.2 kg/hour; water: 6.6 kg/hour; and operating conditions for the twin-screw extruder were those at 50° C. and 260 rpm.

Then, immediately a water diluted liquid of IPDA having an amino group content corresponding to 95% of the NCO group was added to cause chain extension, so that a polyurethane emulsion (X-3) having a urethane resin content of 50% by mass was finally obtained.

Synthesis Example 4

1,000 Parts by mass of PTMG 2000, 37.5 parts by mass of polyethylene glycol ("PEG 600", manufactured by NOF Corporation; number average molecular weight: 600; hereinafter, abbreviated to "PEG"), and 262 parts by mass of HMDI were reacted in the presence of 0.1 part by mass of tin(II) octylate at 100° C. until the NCO % reached 2.8% by mass to obtain a urethane prepolymer A4.

A4 heated to 70° C., a 20% by mass aqueous solution of sodium dodecylbenzenesulfonate ("NEOGEN S-20F", manufactured by Dai-ichi Kogyo Seiyaku Co., Ltd.) as an emulsifying agent, and water were fed at the same time to a twin-screw extruder (TEM-18SS, manufactured by Toshiba Machine Co., Ltd.) and mixed with each other to obtain an emulsion. The respective feed rates of the liquids fed were as follows: A4: 10 kg/hour; aqueous solution of emulsifying agent: 2.0 kg/hour; water: 1.2 kg/hour; and operating conditions for the twin-screw extruder were those at 50° C. and 260 rpm.

Then, immediately a water diluted liquid of IPDA having an amino group content corresponding to 95% of the NCO group was added to cause chain extension, so that a polyurethane emulsion (X-4) having a urethane resin content of 58% by mass was finally obtained.

Synthesis Example 5

1,000 Parts by mass of PTMG 2000, 18 parts by mass of PEG, and 262 parts by mass of HMDI were reacted in the presence of 0.1 part by mass of tin(II) octylate at 100° C. until the NCO % reached 3.1% by mass to obtain a urethane prepolymer A5.

A5 heated to 70° C., a polypropylene-polyethylene copolymer ("PLURONIC L-64", manufactured by ADEKA Corporation) as an emulsifying agent, and water were fed at the same time to a twin-screw extruder (TEM-18SS, manufactured by Toshiba Machine Co., Ltd.) and mixed with each other to obtain an emulsion. The respective feed rates of the liquids fed were as follows: A5: 10 kg/hour; emulsifying agent: 0.5 kg/hour; water: 5.8 kg/hour; and operating conditions for the twin-screw extruder were those at 50° C. and 260 rpm.

Then, immediately a water diluted liquid of IPDA having an amino group content corresponding to 95% of the NCO group was added to cause chain extension, so that a polyurethane emulsion (X-5) having a urethane resin content of 50% by mass was finally obtained.

Synthesis Example 6

1,000 Parts by mass of PTMG 2000, 18 parts by mass of polyethylene glycol dimethyl ether ("M 550", manufactured by NOF Corporation; number average molecular weight: 550; hereinafter, abbreviated to "MPEG"), and 262 parts by mass of HMDI were reacted in the presence of 0.1 part by mass of tin(II) octylate at 100° C. until the NCO % reached 3.3% by mass to obtain a urethane prepolymer A6.

A6 heated to 70° C. and water were fed at the same time to a twin-screw extruder (TEM-18SS, manufactured by Toshiba Machine Co., Ltd.) and mixed with each other to obtain an emulsion. The respective feed rates of the liquids fed were as follows: A6: 10 kg/hour; water: 4.9 kg/hour; and operating conditions for the twin-screw extruder were those at 50° C. and 260 rpm.

Then, immediately a water diluted liquid of IPDA having an amino group content corresponding to 95% of the NCO group was added to cause chain extension, so that a polyurethane emulsion (X-6) having a urethane resin content of 50% by mass was finally obtained.

Synthesis Example 7

1,000 Parts by mass of PTMG 2000, 18 parts by mass of PEG, and 262 parts by mass of HMDI were reacted in the presence of 0.1 part by mass of tin(II) octylate at 100° C. until the NCO % reached 3.1% by mass to obtain a urethane prepolymer A7.

A7 heated to 70° C. and, as an emulsifying agent, a 20% by mass aqueous solution of sodium dodecylbenzenesulfonate ("NEOGEN S-20F", manufactured by Dai-ichi Kogyo Seiyaku Co., Ltd.) and a polypropylene-polyethylene copolymer ("PLURONIC L-64", manufactured by ADEKA Corporation), and water were fed at the same time to a twin-screw extruder (TEM-18SS, manufactured by Toshiba Machine Co., Ltd.) and mixed with each other to obtain an emulsion. The respective feed rates of the liquids fed were as follows: A7: kg/hour; aqueous solution of emulsifying agent S-20F: 1.3 kg/hour; emulsifying agent L-64: 0.3 kg/hour; water: 1.1 kg/hour; and operating conditions for the twin-screw extruder were those at 50° C. and 260 rpm.

Then, immediately a water diluted liquid of ethylenediamine (hereinafter, abbreviated to "EA") having an amino group content corresponding to 95% of the NCO group was added to cause chain extension, so that a polyurethane emulsion (X-7) having a urethane resin content of 60% by mass was finally obtained.

Comparative Synthesis Example 1

1,000 Parts by mass of PTMG 2000, 34 parts by mass of DMPA, and 262 parts by mass of HMDI were reacted in the presence of 0.1 part by mass of tin(II) octylate at 100° C. until the NCO % reached 1.6% by mass to obtain a urethane prepolymer A'1.

A'1 heated to 70° C., triethylamine, a 20% by mass aqueous solution of sodium dodecylbenzenesulfonate ("NEOGEN S-20F", manufactured by Dai-ichi Kogyo Seiyaku Co., Ltd.) as an emulsifying agent, and water were fed at the same time to a twin-screw extruder (TEM-18SS, manufactured by Toshiba Machine Co., Ltd.) and mixed with each other to obtain an emulsion.

Preparation of a polyurethane emulsion having a solids concentration of 50% was attempted using the same liquids fed and operating conditions for the twin-screw extruder as those in Example 1, and a water diluted liquid of IPDA having an amino group content corresponding to 95% of the NCO group was immediately added to the obtained emulsion to cause chain extension, but gelation occurred, so that an emulsion was not able to be obtained.

Therefore, a polyurethane emulsion having the water amount increased or having the solids content reduced was prepared. The respective feed rates of the liquids fed were as follows: A'1: 10 kg/hour; triethylamine: 0.2 kg/hour; aqueous solution of emulsifying agent: 2.5 kg/hour; water: 19.6 kg/hour; and operating conditions for the twin-screw extruder were those at 50° C. and 260 rpm.

Then, immediately a water diluted liquid of IPDA having an amino group content corresponding to 95% of the NCO group was added to cause chain extension, so that a polyurethane emulsion (XR-1) having a urethane resin content of 30% by mass was finally obtained.

Comparative Synthesis Example 2

1,000 Parts by mass of PTMG 2000, 34 parts by mass of DMPA, and 262 parts by mass of HMDI were reacted in the presence of 0.1 part by mass of tin(II) octylate at 100° C. until the NCO % reached 1.6% by mass to obtain a urethane prepolymer A'2.

A'2 heated to 70° C., triethylamine, a polypropylene-polyethylene copolymer ("PLURONIC L-64", manufactured by ADEKA Corporation) as an emulsifying agent, and water were fed at the same time to a twin-screw extruder (TEM-18SS, manufactured by Toshiba Machine Co., Ltd.) and mixed with each other to obtain an emulsion.

Preparation of a polyurethane emulsion having a urethane resin content of 50% by mass was attempted using the same liquids fed and operating conditions for the twin-screw extruder as those in Example 2, and a water diluted liquid of IPDA having an amino group content corresponding to 95% of the NCO group was immediately added to the obtained emulsion to cause chain extension, but gelation occurred, so that an emulsion was not able to be obtained.

Therefore, a polyurethane emulsion having the water amount increased or having the solids content reduced was prepared. The respective feed rates of the liquids fed were as follows: A'2: 10 kg/hour; triethylamine: 0.2 kg/hour; aqueous solution of emulsifying agent: 0.5 kg/hour; water: 21.6 kg/hour; and operating conditions for the twin-screw extruder were those at 50° C. and 260 rpm.

Then, immediately a water diluted liquid of IPDA having an amino group content corresponding to 95% of the NCO group was added to cause chain extension, so that a polyurethane emulsion (XR-2) having a urethane resin content of 30% by mass was finally obtained.

Comparative Synthesis Example 3

1,000 Parts by mass of PTMG 2000, 34 parts by mass of DMPA, and 262 parts by mass of HMDI were reacted in the presence of 0.1 part by mass of tin(II) octylate at 100° C. until the NCO % reached 1.6% by mass to obtain a urethane prepolymer A'3.

A'3 heated to 70° C., triethylamine, and water were fed at the same time to a twin-screw extruder (TEM-18SS, manufactured by Toshiba Machine Co., Ltd.) and mixed with each other to obtain an emulsion.

Preparation of a polyurethane emulsion having a urethane resin content of 50% by mass was attempted using the same liquids fed and operating conditions for the twin-screw extruder as those in Example 3, and a water diluted liquid of IPDA having an amino group content corresponding to 95% of the NCO group was immediately added to the obtained emulsion to cause chain extension, but gelation occurred, so that an emulsion was not able to be obtained.

Therefore, a polyurethane emulsion having the water amount increased or having the solids content reduced was prepared. The respective feed rates of the liquids fed were as follows: A'3: 10 kg/hour; triethylamine: 0.2 kg/hour; aqueous solution of emulsifying agent: 0.5 kg/hour; water: 20.4 kg/hour; and operating conditions for the twin-screw extruder were those at 50° C. and 260 rpm.

Then, immediately a water diluted liquid of IPDA having an amino group content corresponding to 95% of the NCO group was added to cause chain extension, so that a polyurethane emulsion (XR-3) having a urethane resin content of 30% by mass was finally obtained.

Comparative Synthesis Example 4

1,000 Parts by mass of PTMG 2000, 75 parts by mass of PEG, and 262 parts by mass of HMDI were reacted in the presence of 0.1 part by mass of tin(II) octylate at 100° C. until the NCO % reached 2.4% by mass to obtain a urethane prepolymer A'4.

A'4 heated to 70° C., a 20% by mass aqueous solution of sodium dodecylbenzenesulfonate ("NEOGEN S-20F", manufactured by Dai-ichi Kogyo Seiyaku Co., Ltd.) as an emulsifying agent, and water were fed at the same time to a twin-screw extruder (TEM-18SS, manufactured by Toshiba Machine Co., Ltd.) and mixed with each other to obtain an emulsion.

Preparation of a polyurethane emulsion having a urethane resin content of 60% by mass was attempted using the same liquids fed and operating conditions for the twin-screw extruder as those in Example 4, and a water diluted liquid of IPDA having an amino group content corresponding to 95% of the NCO group was immediately added to the obtained emulsion to cause chain extension, but gelation occurred, so that an emulsion was not able to be obtained.

Therefore, a polyurethane emulsion having the water amount increased or having the solids content reduced was prepared. The respective feed rates of the liquids fed were as follows: A'4: 10 kg/hour; aqueous solution of emulsifying agent: 2.5 kg/hour; water: 9.3 kg/hour; and operating conditions for the twin-screw extruder were those at 50° C. and 260 rpm.

Then, immediately a water diluted liquid of IPDA having an amino group content corresponding to 95% of the NCO group was added to cause chain extension, so that a polyurethane emulsion (XR-4) having a urethane resin content of 40% by mass was finally obtained.

Comparative Synthesis Example 5

1,000 Parts by mass of PTMG 2000, 75 parts by mass of PEG, and 262 parts by mass of HMDI were reacted in the presence of 0.1 part by mass of tin(II) octylate at 100° C. until the NCO % reached 2.4% by mass to obtain a urethane prepolymer A'5.

A'5 heated to 70° C., a 20% by mass aqueous solution of sodium dodecylbenzenesulfonate ("NEOGEN S-20F", manufactured by Dai-ichi Kogyo Seiyaku Co., Ltd.) as an emulsifying agent, and water were fed at the same time to a twin-screw extruder (TEM-18SS, manufactured by Toshiba Machine Co., Ltd.) and mixed with each other to obtain an emulsion.

Preparation of a polyurethane emulsion having a urethane resin content of 50% by mass was attempted using the same liquids fed and operating conditions for the twin-screw extruder as those in Example 5, and a water diluted liquid of IPDA having an amino group content corresponding to 95% of the NCO group was immediately added to the obtained emulsion to cause chain extension, but gelation occurred, so that an emulsion was not able to be obtained.

Therefore, a polyurethane emulsion having the water amount increased or having the solids content reduced was prepared. The respective feed rates of the liquids fed were as follows: A'S: 10 kg/hour; aqueous solution of emulsifying agent: 0.5 kg/hour; water: 11.3 kg/hour; and operating conditions for the twin-screw extruder were those at 50° C. and 260 rpm.

Then, immediately a water diluted liquid of IPDA having an amino group content corresponding to 95% of the NCO group was added to cause chain extension, so that a polyurethane emulsion (XR-5) having a urethane resin content of 40% by mass was finally obtained.

Comparative Synthesis Example 6

1,000 Parts by mass of PTMG 2000, 69 parts by mass of MPEG, and 262 parts by mass of HMDI were reacted in the presence of 0.1 part by mass of tin(II) octylate at 100° C. until the NCO % reached 2.8% by mass to obtain a urethane prepolymer A'6.

A'6 heated to 70° C. and water were fed at the same time to a twin-screw extruder (TEM-18SS, manufactured by Toshiba Machine Co., Ltd.) and mixed with each other to obtain an emulsion.

Preparation of a polyurethane emulsion having a urethane resin content of 50% by mass was attempted using the same liquids fed and operating conditions for the twin-screw extruder as those in Example 6, and a water diluted liquid of IPDA having an amino group content corresponding to 95% of the NCO group was immediately added to the obtained emulsion to cause chain extension, but gelation occurred, so that an emulsion was not able to be obtained.

Therefore, a polyurethane emulsion having the water amount increased or having the solids content reduced was prepared. The respective feed rates of the liquids fed were as follows: A'6: 10 kg/hour; water: 10.3 kg/hour; and operating conditions for the twin-screw extruder were those at 50° C. and 260 rpm.

Then, immediately a water diluted liquid of IPDA having an amino group content corresponding to 95% of the NCO group was added to cause chain extension, so that a polyurethane emulsion (XR-6) having a urethane resin content of 40% by mass was finally obtained.

Example 1

1,000 Parts by mass of the polyurethane emulsion (X-1) obtained in Synthesis Example 1 and 2 parts by mass of a thickener ("Borchi Gel ALA", manufactured by Borchers GmbH) were stirred at 2,000 rpm using a mechanical mixer to prepare a blend. Then, the blend and air were continuously fed to a rotor-stator continuous mixer ("MagicLab", manufactured by IKA) and mixed to obtain a foamed liquid. In this instance, a volume and weight of the blend were measured and a density was determined, and the feed rate of air was controlled so that the density of the foamed liquid became 2/3.

Polyester nonwoven fabric was immersed in the obtained foamed liquid and then, using mangle rolls having a clearance adjusted to the thickness of the polyester nonwoven fabric, the impregnation amount of the foamed liquid was controlled, and then the resultant fabric was dried by means of a hot-air dryer at 70° C. for 2 minutes and further at 120° C. for 2 minutes to obtain a fiber substrate filled with the urethane resin.

Examples 2 to 7 and Comparative Examples 1 to 6

Fiber substrates were individually obtained in substantially the same manner as in Example 1 except that the type of the polyurethane emulsion (X-1) used was changed as shown in Tables 1 and 2.

[Method for Measuring a Number Average Molecular Weight]

The number average molecular weight of the polyol and the like used in the Synthesis Examples and Comparative Synthesis Examples is a value as measured by a gel permeation column chromatography (GPC) method under the conditions shown below.

Measuring apparatus: High-speed GPC apparatus ("HLC-8220GPC", manufactured by Tosoh Corp.)

Columns: The columns shown below, manufactured by Tosoh Corp., which were connected in series were used.

"TSKgel G5000" (7.8 mm I.D.×30 cm)×1
"TSKgel G4000" (7.8 mm I.D.×30 cm)×1
"TSKgel G3000" (7.8 mm I.D.×30 cm)×1
"TSKgel G2000" (7.8 mm I.D.×30 cm)×1

Detector: RI (differential refractometer)

Column temperature: 40° C.

Eluent: Tetrahydrofuran (THF)

Flow rate: 1.0 mL/minute

Sample amount per injection: 100 μL (tetrahydrofuran solution having a sample concentration of 0.4% by mass)

Standard sample: A calibration curve was prepared using the standard polystyrenes shown below.

(Standard Polystyrenes)

"TSKgel standard polystyrene A-500", manufactured by Tosoh Corp.
"TSKgel standard polystyrene A-1000", manufactured by Tosoh Corp.
"TSKgel standard polystyrene A-2500", manufactured by Tosoh Corp.
"TSKgel standard polystyrene A-5000", manufactured by Tosoh Corp.
"TSKgel standard polystyrene F-1", manufactured by Tosoh Corp.
"TSKgel standard polystyrene F-2", manufactured by Tosoh Corp.
"TSKgel standard polystyrene F-4", manufactured by Tosoh Corp.
"TSKgel standard polystyrene F-10", manufactured by Tosoh Corp.
"TSKgel standard polystyrene F-20", manufactured by Tosoh Corp.
"TSKgel standard polystyrene F-40", manufactured by Tosoh Corp.
"TSKgel standard polystyrene F-80", manufactured by Tosoh Corp.

"TSKgel standard polystyrene F-128", manufactured by Tosoh Corp.

"TSKgel standard polystyrene F-288", manufactured by Tosoh Corp.

"TSKgel standard polystyrene F-550", manufactured by Tosoh Corp.

[Method for Measuring an Average Particle Diameter of the Urethane Resin (X)]

With respect to each of the urethane resin water dispersions obtained in the Examples and Comparative Examples, using a laser diffraction/scattering particle size distribution measurement apparatus ("LA-910", manufactured by Horiba, Ltd.), and using water as a dispersing medium, an average particle diameter was measured when the relative refractive index was 1.10 and the particle diameter standard was an area.

[Evaluation Method for Retention of Foam by Observing the Appearance]

Nonwoven fabric was immersed in the foamed liquid and the amount of the foamed liquid was adjusted using mangle rolls, and then the surface of the resultant nonwoven fabric was visually observed and evaluated according to the following criteria.

"A": Foam is retained and a film of the foamed liquid is formed on the surface of the nonwoven fabric.

"B": A phenomenon in which foam breaks and disappears after using the mangle rolls can be seldom seen.

"C": A phenomenon in which foam breaks and disappears after using the mangle rolls can be frequently seen.

"D": After using the mangle rolls, foam has disappeared and the fiber of the nonwoven fabric is exposed.

[Evaluation Method for Retention of Foam by Means of a Microscope]

With respect to each of the fiber substrates obtained in the Examples and Comparative Examples, a cross-section was observed using a scanning electron microscope ("SU3500", manufactured by Hitachi High-Technologies Corporation; magnification: 200 times), and evaluated according to the following criteria.

"T": The urethane resin forms a porous structure inside the fiber substrate.

"F": The urethane resin does not form a porous structure inside the fiber substrate.

[Evaluation Method for Hand Feeling]

The obtained processed fabric was evaluated by touch according to the following criteria.

"A": Excellent flexibility.

"B": Slight flexibility.

"C": Poor flexibility.

"D": Hard.

[Evaluation Method for Bent State]

The obtained processed fabric was bent at 90° by hands, and the state of appearance at that time was visually observed and evaluated according to the following criteria.

"A": The bent portion is curved and forms no wrinkle.

"B": The bent portion is curved and forms small wrinkles.

"C": The bent portion is at an acute angle and forms small wrinkles.

"D": The bent portion is at an acute angle and forms large wrinkles.

TABLE 1

| | | Example 1 | Example 2 | Example 3 | Example 4 | Example 5 | Example 6 | Example 7 |
|---|---|---|---|---|---|---|---|---|
| Chain extender (a1) | Type | IPDA | IPDA | IPDA | IPDA | IPDA | IPDA | EA |
| | Molecular weight | 170.3 | 170.3 | 170.3 | 170.3 | 170.3 | 170.3 | 60.1 |
| Compound (a4) having hydrophilic group | Type | DMPA | DMPA | DMPA | PEG | PEG | MPEG | PEG |
| | Amount (% By mass | 1.8 | 1.8 | 1.8 | 1.5 | 1.5 | 1.4 | 1.5 |
| Urethane resin (X) content (% By mass) | | 50 | 50 | 50 | 50 | 60 | 50 | 60 |
| Average particle diameter (μm) of urethane resin (X) | | 0.23 | 0.28 | 0.81 | 0.19 | 0.18 | 0.51 | 0.18 |
| Emulsifying agent | Type | Anionic emulsifying agent | Nonionic emulsifying agent | None | Anionic emulsifying agent | Nonionic emulsifying agent | None | Anionic emulsifying agent, Nonionic emulsifying agent |
| Evaluation of retention of foam | Evaluation by appearance | A | A | A | A | A | A | A |
| | Evaluation by microscope | T | T | T | T | T | T | T |
| Evaluation of hand feeling | | A | A | A | A | A | A | A |
| Evaluation of bent state | | A | A | B | A | A | B | A |

TABLE 2

| | | Comparative Example 1 | Comparative Example 2 | Comparative Example 3 | Comparative Example 4 | Comparative Example 5 | Comparative Example 6 |
|---|---|---|---|---|---|---|---|
| Chain extender (a1) | Type | IPDA | IPDA | IPDA | IPDA | IPDA | IPDA |
| | Molecular weight | 170.3 | 170.3 | 170.3 | 170.3 | 170.3 | 170.3 |
| Compound (a4) having hydrophilic group | Type | DMPA | DMPA | DMPA | PEG | PEG | MPEG |
| | Amount (% By mass) | 2.6 | 2.6 | 2.6 | 5.6 | 5.6 | 5.2 |
| Urethane resin (X) content (% By mass) | | 30 | 30 | 30 | 40 | 40 | 40 |
| Average particle diameter (μm) of urethane resin (X) | | 0.02 | 0.02 | 0.03 | 0.12 | 0.13 | 0.3 |

TABLE 2-continued

| | | Comparative Example 1 | Comparative Example 2 | Comparative Example 3 | Comparative Example 4 | Comparative Example 5 | Comparative Example 6 |
|---|---|---|---|---|---|---|---|
| Emulsifying agent | Type | Anionic emulsifying agent | Nonionic emulsifying agent | None | Anionic emulsifying agent | Nonionic emulsifying agent | None |
| Evaluation of retention of foam | Evaluation by appearance | C | C | D | C | D | D |
| | Evaluation by microscope | F | F | F | F | F | F |
| Evaluation of hand feeling | | D | D | D | C | C | C |
| Evaluation of bent state | | C | C | D | C | D | D |

As seen from Examples 1 to 7, it was found that the fiber substrate of the invention has excellent filling state of the urethane resin and excellent hand feeling.

On the other hand, in Comparative Examples 1 to 6 which correspond to an embodiment in which the urethane resin (X) content is less than the range defined in the invention, the retention of foam was poor such that excellent formation of a porous structure inside the nonwoven fabric was not achieved, and the hand feeling was poor.

The invention claimed is:

1. A fiber substrate filled with a urethane resin (X), which is formed from a water dispersion of the urethane resin (X), wherein the water dispersion of the urethane resin (X) is obtained by reacting a polyol (a2), a polyisocyanate (a3), and a compound (a4) having a hydrophilic group with each other without using a solvent to obtain a urethane prepolymer (i) having an isocyanate group, and then reacting the urethane prepolymer (i) having an isocyanate group with an emulsifying agent, water, and chain extender (a1) to obtain the water dispersion of the urethane resin (X);

wherein the compound (a4) having a hydrophilic group is a polyethylene glycol or a polyethylene glycol dimethyl ether;

wherein the emulsifying agent consists of an anionic emulsifying agent;

wherein the water dispersion has a urethane resin (X) content of 50 to 80% by mass, and the water dispersion contains no organic solvent; and wherein the urethane resin (X) has a nonionic group and has no anionic group.

2. The fiber substrate according to claim 1, wherein the chain extender (a1) has an amino group.

3. The fiber substrate according to claim 2, wherein the urethane resin (X) has an average particle diameter in the range of from 0.01 to 1 μm.

4. The fiber substrate according to claim 2, wherein the amount of the compound (a4) used is 5% by mass or less, based on the total mass of the raw materials constituting the urethane resin (X).

5. An artificial leather having the fiber substrate according to claim 3.

6. The fiber substrate according to claim 1, wherein the urethane resin (X) has an average particle diameter in the range of from 0.01 to 1 μm.

7. The fiber substrate according to claim 6, wherein the amount of the compound (a4) used is 5% by mass or less, based on the total mass of the raw materials constituting the urethane resin (X).

8. An artificial leather having the fiber substrate according to claim 5.

9. The fiber substrate according to claim 1 wherein the amount of the compound (a4) used is 5% by mass or less, based on the total mass of the raw materials constituting the urethane resin (X).

10. An artificial leather having the fiber substrate according to claim 1.

* * * * *